United States Patent [19]
Heidacker et al.

[11] 3,958,418
[45] May 25, 1976

[54] CLAMP ARRANGEMENT

[75] Inventors: Walter C. Heidacker, Bloomfield Hills; Paul H. Nagel, Sterling Heights, both of Mich.

[73] Assignee: General Motors Corporation, Detroit, Mich.

[22] Filed: Sept. 3, 1974

[21] Appl. No.: 502,539

[52] U.S. Cl. .......................... 60/323; 24/DIG. 25; 60/272; 60/282; 60/901; 285/137 R; 403/230; 403/338
[51] Int. Cl.² ........................................ F01N 7/10
[58] Field of Search ............ 60/323, 272, 282, 901; 285/137 R; 24/DIG. 25; 403/13, 186, 230, 337, 338

[56] References Cited
UNITED STATES PATENTS

| | | | |
|---|---|---|---|
| 2,643,139 | 6/1953 | Hamilton | 403/338 |
| 3,712,064 | 1/1973 | Kuhn | 60/272 |
| 3,809,019 | 5/1974 | Stoltman | 60/901 |
| 3,851,849 | 12/1974 | Green | 403/230 |
| 3,869,153 | 3/1975 | Vincent | 285/137 R |

Primary Examiner—Douglas Hart
Attorney, Agent, or Firm—Ronald L. Phillips

[57] ABSTRACT

A clamp arrangement clamping a thermal reactor to a rotary engine comprising a clamp member that is first connected by spherically seating fasteners to the engine so as to pivot to receive the reactor which then makes these fasteners inaccessible and wherein additional fasteners are then employed at readily accessible locations to apply distributed load on the clamp member to tightly clamp the reactor to the engine.

4 Claims, 4 Drawing Figures

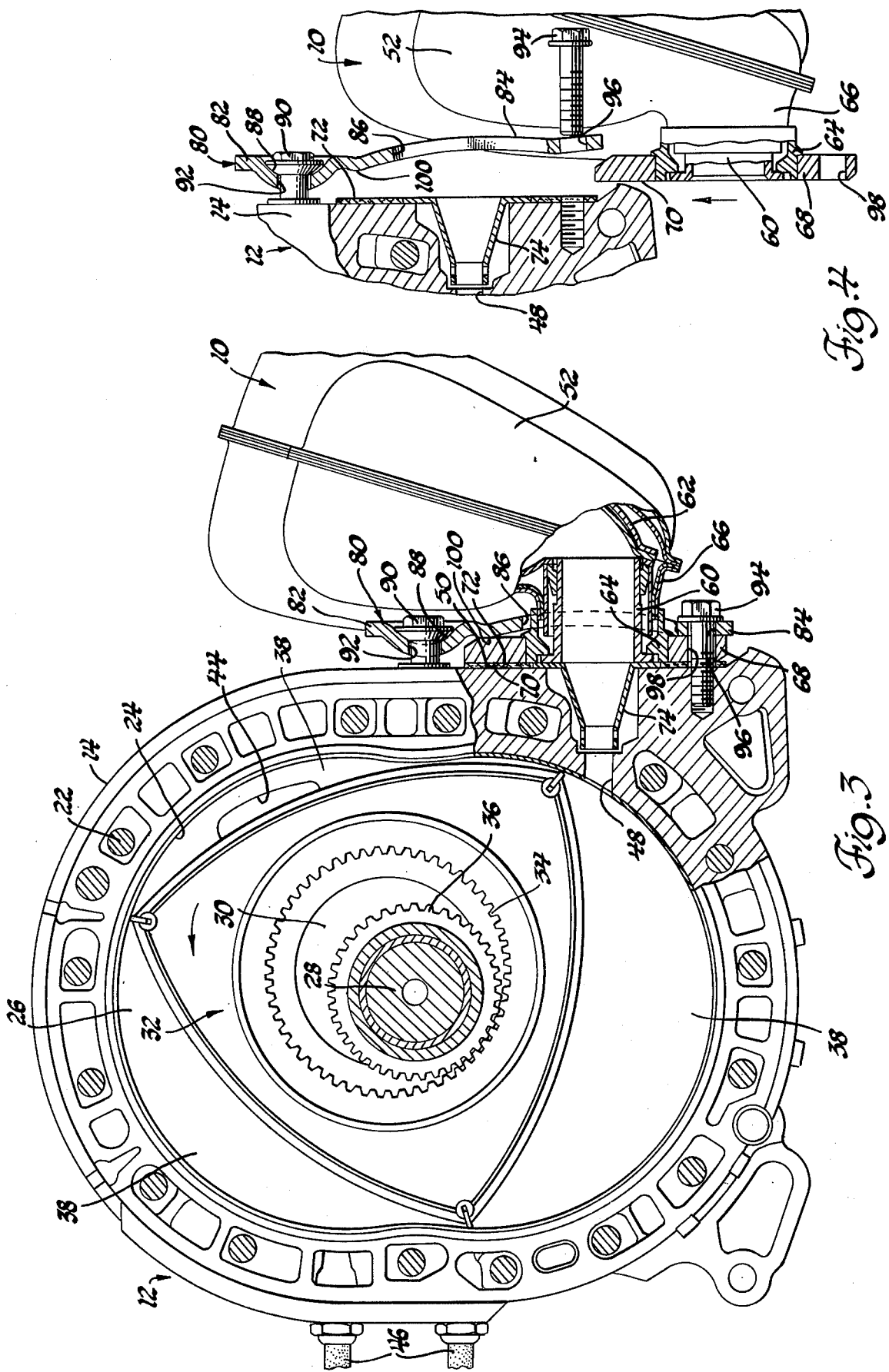

CLAMP ARRANGEMENT

This invention relates to a clamp arrangement and more particularly to a clamp arrangement wherein a clamp member is first secured by a fastener later made inaccessible and the actual clamping load is applied by another fastener at a readily accessible location.

In certain apparatus it is not possible accessibility-wise to use a fastener in a location where load can be best applied to clamp one device to another. As a result, there is generally a compromise made which relocates this fastener in the next best location or resort may be made to some complicated clamping arrangement with an attendant substantial cost burden. One such difficult installation has been found in attempting to clamp a thermal reactor to a rotary engine where the main body of the reactor is arranged closely along the exhaust side of the engine for heat reasons and compactness. As a result, the reactor blocks the use of conventional fasteners where they can best be employed to secure the reactor's flange to the engine.

According to the present invention there is provided a clamp arrangement as shown in use in clamping a thermal reactor to a dual-rotor rotary engine wherein a clamp member is first connected to the engine by spherically seating fasteners in the best suited locations but which will be made inaccessible when the reactor is installed. These fasteners permit the clamp member to pivot to receive the attaching reactor flange whereafter the clamp member is pivoted to engage the flange at one location and simple flat seating fasteners are then employed at readily accessible locations on flexible arms of the clamp member to apply clamp load on the flange at this location and also at the previously engaged location.

An object of the present invention is to provide a new and improved clamp arrangement.

Another object is to provide a clamp arrangement having a clamp member which is first secured so as to pivot to receive the device to be clamped by a pivot-securing fastener which can then be made inaccessible by the clamped device whereafter a simple fastener is employed at a readily accessible location to apply clamping load at this location and also at the inaccessible location.

Another object is to provide a clamp arrangement for clamping a device such as a thermal reactor to a rotary engine by a clamp member that is first connected to the engine so as to pivot to receive a flange on the reactor by a spherically seating fastener which is then made inaccessible by the reactor with the clamp member having an arm extending over the flange and about a reactor header tube and being secured together with the flange by a fastener which on tightening flexes the arm which together with a rigid section of the clamp member applies clamping load on the flange on opposite sides of the header tube to clamp the reactor to the engine.

These and other objects of the present invention will become more apparent with reference to the following description and drawing in which:

FIG. 3 is a view taken along the line 3—3 in FIG. 1.

FIG. 4 is a view showing how the clamp arrangement permits the assembly in FIGS. 1 and 3.

Figure 1:
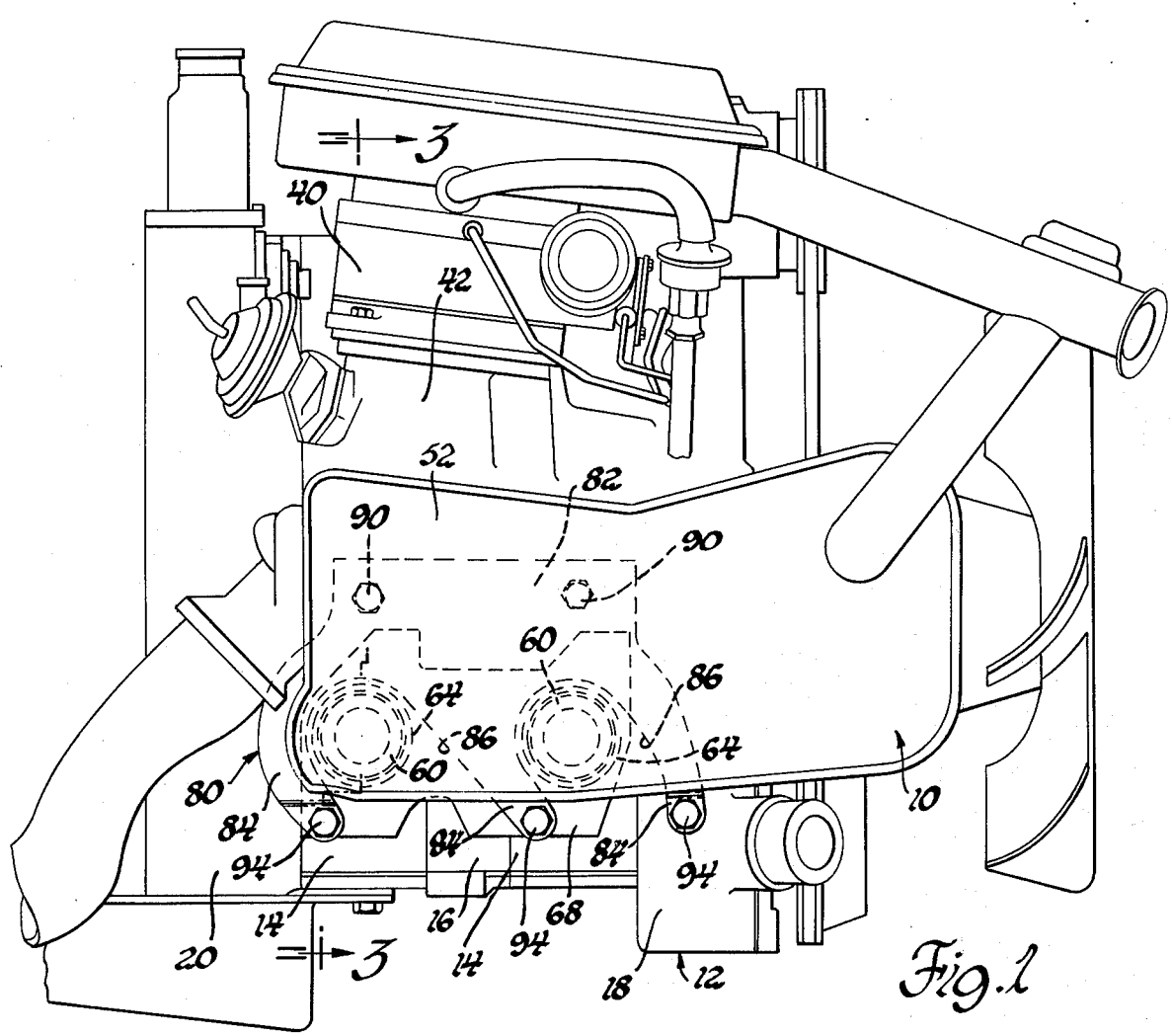
FIG. 1 is a side elevation view of a rotary engine having a thermal reactor clamped thereto by a clamp arrangement according to the present invention.

The clamp arrangement according to the present invention is readily suited to clamp for example an exhaust manifold, in this case a thermal reactor 10, to a two-rotor internal combustion rotary engine 12 which as shown in FIGS. 1 and 3 generally comprises a stationary body having a pair of identical rotor housings 14, an intermediate housing 16, a front end housing 18 and a rear end housing 20 which are all secured together by bolts 22. Each of the rotor housings 14 has a two-lobe internal peripheral wall 24 as shown in FIG. 3, and there are provided oppositely facing end walls 26 at the interfaces of the intermediate housing and respective end housings that cooperate with the respective peripheral walls 24 to provide a pair of cavities. A crankshaft 28 is rotatably mounted near its opposite ends in the front and rear end housings 18 and 20 and has eccentrics 30 located in the respective cavities, these eccentrics being angularly spaced 180° apart. A three-lobe rotor 32 is rotatably mounted on each eccentric 30 and has two parallel sides opposite the end walls 26 and three peripheral faces opposite the peripheral wall 24. Each rotor 32 has an internal tooth gear 34 on the outboard side whose center is on the rotor axis and whose teeth mesh with an annular external tooth gear 36 which is freely received about and is concentric with the crankshaft and is secured to the engine's stationary body, the stationary gear for the front rotor being secured to the front end housing 18 and the stationary gear for the rear rotor being secured to the rear end housing 20. The internal tooth rotor gears have one and onehalf times the number of teeth as the stationary gears with the result that the rotors in the crankshaft turn in a fixed speed relationship while the rotors planetate with a fixed relationship to the rotor housings with the rotors turning at one-third the speed of the crankshaft and the rotors phased 60° apart. The rotor faces and the housing walls cooperate to provide three working chambers 38 that are spaced about and move with the respective rotors within the respective rotor housings while varying in volume as the rotors planetate, there being provided suitable gas seals and oil seals on the rotors as shown in FIG. 3 to seal these chambers from each other and from the lubrication system.

Describing now the induction system, a carburetor 40 delivers a combustible air-fuel mixture to an intake manifold 42 which is bolted to the intermediate and end housings 16, 18 and 20 and has internal passages which communicate with intake passages in the intermediate and end housings that terminate in side intake ports 44 that are located opposite each other in the respective end walls 26 as shown in FIG. 3. Upon rotor rotation in the direction indicated by the arrow in FIG. 3, the air-fuel mixture is sequentially periodically admitted to the working chambers 38 as they are expanding by the traversing motion of the rotor sides relative to the intake ports whereafter these chambers then close to the intake ports and contract to compress the thus trapped mixture in readiness for ignition. Combustion by spark ignition is provided by an ignition system which has two spark plugs 46 mounted in each of the rotor housings. Sequential ignition of the air-fuel mixture in the chambers is effected by the spark plugs receiving timed ignition pulses from a distributor, not shown, which is driven from the crankshaft 28. The electrodes of the spark plugs are open to the working chambers 38 through the rotor housing's internal peripheral wall 24 and are peripherally spaced thereabout so that one plug is said to lead the other, the plugs being fired according to certain engine operating conditions as is well known. With combustion, the peripheral wall takes the reaction to force the rotor to continue rotating and eventually each working chamber following the power phase is exhausted during the exhaust phase through an exhaust port 48 in the peripheral wall 24 which extends out through the rotor housing 14 through a flat face 50 machined on the exterior thereof as shown in FIG. 3.

The exhaust gas from the two exhaust ports 48 is delivered to the thermal reactor 10 which thus must be firmly secured to the engine with good sealing. However, the reactor's main body 52 has a relatively large outer envelope and is arranged along side of and close to the exhaust side of the engine in an upstanding position for heating reasons and compactness. As a result, there is no accessibility for a conventional fastener such as a bolt to be used between the main reactor body 52 and the engine housing to properly secure the reactor to the engine. However, there is room beneath the main reactor body for the use of such fasteners.

To communicate with the exhaust ports 48 and also to provide accommodation for the clamp arrangement according to the present invention, the reactor has a pair of outwardly extending header pipes 60 which are connected to the reactor's insulated inner liner 62 and align with the engine's two exhaust ports 48 in the rotor housings. The header pipes 60 are supported in collars 64 which are secured to tubular extensions of the reactor's cover 66 surrounding the header pipes and are firmly mounted in a thick rigid plate flange 68. The flange 68 spans the two rotor housings 14 as shown in FIG. 1 with its flat backside 70 opposite the flat rotor housing faces 50 and a suitable gasket 72 is positioned therebetween for sealing. With the reactor flange 68 secured in place, the reactor assembly serves to clamp in place a sheet metal liner 74 in each exhaust passage such as disclosed in copending U.S. application Ser. No. 502,540 filed Sept. 3, 1974 and assigned to the assignee of the present invention, this liner providing for injecting oxidizing fluid such as air into the exhaust gas to promote burning of the partially burned and unburned compounds in the hot environment of the reactor.

Figure 2:
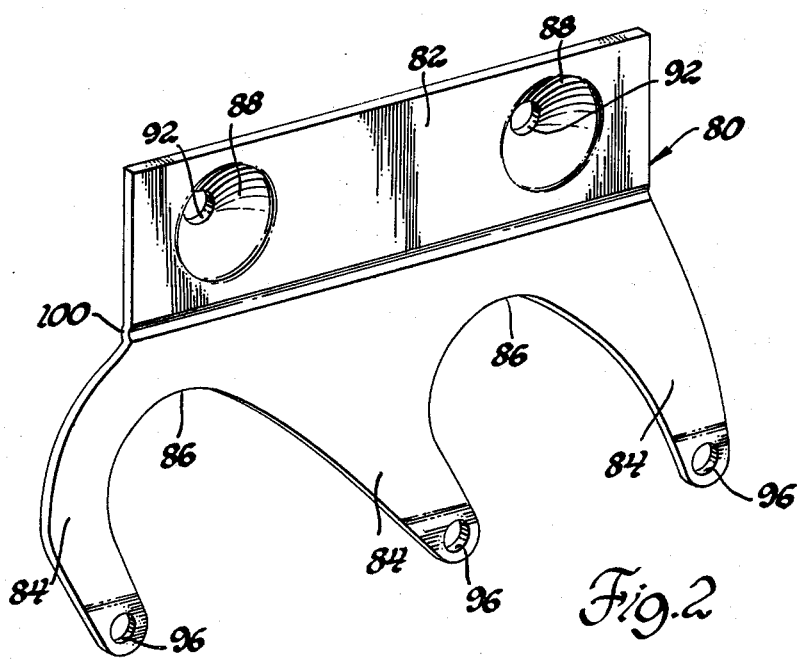
FIG. 2 is an enlarged perspective view of the clamp member.

Describing now the details of the clamp arrangement according to the present invention, there is provided a clamp member generally designated as 80 having a thick rigid plate section 82 and three outwardly curved arms 84 extending therefrom which form two notches 86 for receiving the reactor's two shielded header pipes 60 between the flange 68 and the outer cover 66 of the reactor as shown in FIGS. 1, 2 and 3. The rigid plate section 82 of the clamp spans the two rotor housings 14 and has two spherical sockets 88 formed thereon which are located adjacent the closed ends of the notches 86 and opposite the respective rotor housings. A spherically seating bolt 90 is seated in each socket 88 and extends through a hole 92 therein and is threaded to the respective rotor housing 14 as shown in FIGS. 3 and 4. As a result, the clamp member 80 is then pivotal about an axis at right angles to the spherically seating bolts 90 through the center of the sockets. This allows the clamp member 80 to be pivoted only a required small amount as shown in FIG. 4 sufficient to permit the reactor flange 68 to be slipped under arms 84 into its installed position over the previously located gasket 72 with the shielded header pipes 60 then received in the notches 86 between the arms 84. Next, a more common flat seating bolt 94 is inserted through a hole 96 in the end of each arm 84 and threaded to one of the housings. As shown in FIGS. 1 and 3, the two left-most bolts 94 also extend through aligned holes 98 in the reactor flange and are threaded to the respective rotor housings 14 in locations substantially diametrically opposite the locations of the two spherically seating bolts 90 while the right-hand bolt 94 does not extend through the reactor flange 68 and instead clamp its arm directly to the front end housing 18.

To apply clamping load on the reactor flange 68 on the side of the header pipes 60 opposite where the flat seating bolts 94 are directly clamping the flange, the rigid section 82 of the clamp member 80 is provided with a raised longitudinally extending bead 100 on its inboard or engine side that extends intermediate the sockets 88 and the closed end of the notches 86 parallel to the pivot axis of the clamp member and in a position to engage the reactor flange 68 on its hidden side. The bead 100 engages the reactor flange 68 prior to the flat seating bolts 94 tightly clamping the fingers on the flange to the housings so that as these bolts are tightened, the fingers 84 flex and the bead 100 serves to apply force on the hidden side of the flange without further tightening of the spherically seating bolts 90 which are then inaccessible. Thus, on tightening of the flat seating bolts 94 which are readily accessible after the reactor 10 is in place, there is applied a distributed clamping load on the reactor flange 68 in the desired locations on opposite sides of the header pipes 60 just as if simple bolts could also be used directly on the upper portion of the flange if this area of the flange were not hidden or made inaccessible by the reactor.

The above described embodiment is illustrative of the invention which may be modified within the scope of the appended claims.

We claim:

1. A first device, a second device having an outwardly extending portion with a flange for securing said second device to said first device in an installed position, a clamp member having a rigid plate section and a flexible arm extending therefrom extending over said flange and about one side of said extending portion of said second device, said rigid plate section having a spherical socket that is locatable between said devices in the installed position of said second device, pivot-securing means for pivotally securing said rigid section adjacent said arm to said first device to permit said flange of said second device to be slipped under said clamp member into the installed position, a bolt extending through a hole in both the end of said arm and said flange and threaded to said first device in a location on a side of said extending portion of said second device opposite the side said pivot-securing means is located, and said rigid section having a force applying portion intermediate said pivot-securing means and said extending portion of said second device for engaging said flange between said extending portion and said pivot-securing means prior to said bolt tightly clamping said arm and said flange to said first device whereby said arm flexes as said bolt is tightened and there is applied clamping load on said flange on opposite sides of said extending portion.

2. A first device, a second device having an outwardly extending portion with a flange for securing said second device to said first device in an installed position, a clamp member having a flat rigid plate section and an outwardly curved arm extending therefrom extending over said flange and about one side of said extending portion of said second device, said rigid plate section having a spherical socket that is locatable between said devices in the installed position of said second device, a spherically seating bolt seated in said socket and extending through a hole therein and threaded to said first device whereby said clamp member is pivotal about an axis transverse to said spherically seating bolt through the center of said socket to permit said flange of said second device to be slipped under said clamp member into the installed position, a flat seating bolt extending through a hole in both the end of said arm and said flange and threaded to said first device in a location on a side of said extending portion of said second device opposite the side said spherically seating bolt is located, and said rigid plate section having a force applying raised portion intermediate said socket and said extending portion of said second device for engaging said flange between said extending portion and said socket prior to said flat seating bolt tightly clamping said arm and said flange to said first device whereby said arm flexes as said flat seating bolt is tightened and there is applied clamping load on said flange on opposite sides of said extending portion.

3. A rotary engine comprising a pair of rotor housings, an intermediate housing between said rotor housings, an end housing outboard of each said rotor housing, each said rotor housing having an exhaust port, an exhaust manifold having a main body with a pair of header pipes which are alignable with said exhaust ports in an installed position, a flange connected to said header pipes for securing said exhaust manifold to said housings, a clamp member having a rigid section and three flexible arms extending therefrom forming two notches for receiving said header pipes between said flange and said main body, pivot-securing means for pivotally securing said rigid section to said rotor housings whereby said clamp member is pivotal to permit said flange of said exhaust manifold to be slipped under said clamp member into the installed position wherein said header pipes are received in said notches between said arms, a bolt extending through a hole in both the end of each said arm and said flange and threaded to one of said housings, and said rigid section having a force applying portion intermediate said sockets and the closed ends of said notches for engaging said flange between said header arms and said pivot-securing means prior to said bolts tightly clamping said arms and said flange to said housings whereby said arms flex as said bolts are tightened and there is applied clamping load on said flange on opposite sides of said header pipes.

4. A rotary engine comprising a pair of rotor housings, an intermediate housing between said rotor housings, an end housing outboard of each said rotor housing, each said rotor housing having an exhaust port, a thermal reactor having a main body with a pair of header pipes which are alignable with said exhaust ports in an installed position, a flange connected to said header tubes for securing said thermal reactor to said housings, a clamp member having a flat rigid plate section and three outwardly curved flexible arms extending therefrom forming two notches for receiving said header pipes between said flange and said main body, said rigid plate section adjacent the closed end of each said notch having a spherical socket that is located between one of said rotor housings and said main body when said thermal reactor is in the installed position, a spherically seating bolt seated in each said socket and extending through a hole therein and threaded to the respective rotor housing whereby said clamp member is pivotal about an axis transverse to said spherically seating bolts through the center of said sockets to permit said flange of said thermal reactor to be slipped under said clamp member into the installed position wherein said header pipes are received in said notches between said arms, a flat seating bolt seating on the end of each said arm and extending through a hole in both the end of each said arm and said flange and threaded to one of said housings with two of these bolts threaded to said rotor housings in locations substantially diametrically opposite the locations of said spherically seating bolts relative to said header pipes, and said rigid plate section having a force applying elongated raised portion extending intermediate said sockets and the closed ends of said notches parallel to the pivot axis of said clamp member for engaging said flange between said header pipes and said sockets prior to said flat seating bolts tightly clamping said arms and said flange to said housings whereby said arms flex as said flat seating bolts are tightened and there is applied clamping load on said flange on opposite sides of said header pipes.

* * * * *